US006975866B2

(12) United States Patent
Fattouch

(10) Patent No.: US 6,975,866 B2
(45) Date of Patent: Dec. 13, 2005

(54) PLANIFICATION OF LOCALIZATION AREAS (LAC)

(75) Inventor: Imad Fattouch, Paris (FR)

(73) Assignee: Societe Francaise du Radiotelephone, Paris (FR)

( * ) Notice: Subject to any disclaimer, the term of this patent is extended or adjusted under 35 U.S.C. 154(b) by 391 days.

(21) Appl. No.: 10/215,351

(22) Filed: Aug. 9, 2002

(65) Prior Publication Data

US 2003/0040317 A1 Feb. 27, 2003

(30) Foreign Application Priority Data

Aug. 10, 2001 (FR) .............................. 01 10722

(51) Int. Cl.$^7$ ................................. H04Q 7/20
(52) U.S. Cl. .................. 455/446; 455/67.11; 455/423
(58) Field of Search .............................. 455/67.11, 423, 455/422.1, 446, 449; 703/13–15, 16, 17, 22, 23

(56) References Cited

U.S. PATENT DOCUMENTS

| | | | |
|---|---|---|---|
| 5,561,841 A | * 10/1996 | Markus | 455/446 |
| 5,710,758 A | * 1/1998 | Soliman et al. | 370/241 |
| 5,794,128 A | * 8/1998 | Brockel et al. | 455/67.11 |
| 6,044,273 A | * 3/2000 | Tekinay | 455/446 |
| 6,141,552 A | 10/2000 | Sendonaris et al. | |
| 6,336,035 B1 | * 1/2002 | Somoza et al. | 455/446 |
| 6,356,758 B1 | * 3/2002 | Almeida et al. | 455/446 |
| 6,640,089 B1 | * 10/2003 | Kanaan et al. | 455/67.16 |
| 6,771,957 B2 | * 8/2004 | Chitrapu | 455/423 |

OTHER PUBLICATIONS

Leung et al., "Traffic Models for Wireless Communication Networks", IEEE Journal on Selected Areas in Communications, Oct. 1994, vol. 12, Issue 8, pp. 1353–1364.*

Aleman–Llanes E. et al., "PCS Subscribers Mobility Modeling Using Fractional Brownian Motion (FBM)." *European Transactions on Telecommunications*, Eurel Publication, Milano, Italy, vol. 11, No. 2, Mar. 2, 2002. pp. 191–198, XP000949770.

Saha et al., "Design of a Personal Communication Services Network (PCSN) for Optimum Location Area Size." *Personal Wireless Communications, 1997*. IEEE International Conference on Mumbai, India Dec. 17–19, 1997, pp. 404–408, XP9010268074.

* cited by examiner

*Primary Examiner*—Charles N. Appiah
(74) *Attorney, Agent, or Firm*—Lowe, Hauptman & Berner, LLP

(57) ABSTRACT

According to the procedure for the definition of the topology of a cellular radiotelephony network consisting of several clusters to be defined, of stations for the administration of respective cells with shared borders, the stations of each cluster, each linked to a controller, connected to other controllers intended to administer the mobility of terminals,

- the motion of terminals is modeled using a motion algorithm that distinctly corresponds to the law of random motion for particles of ideal gases,
- intensity values for flows crossing portions of the shared borders are calculated, and
- a section between cells is mapped following the contours corresponding to minimum sectioned flows, according to the various contours.

10 Claims, 1 Drawing Sheet

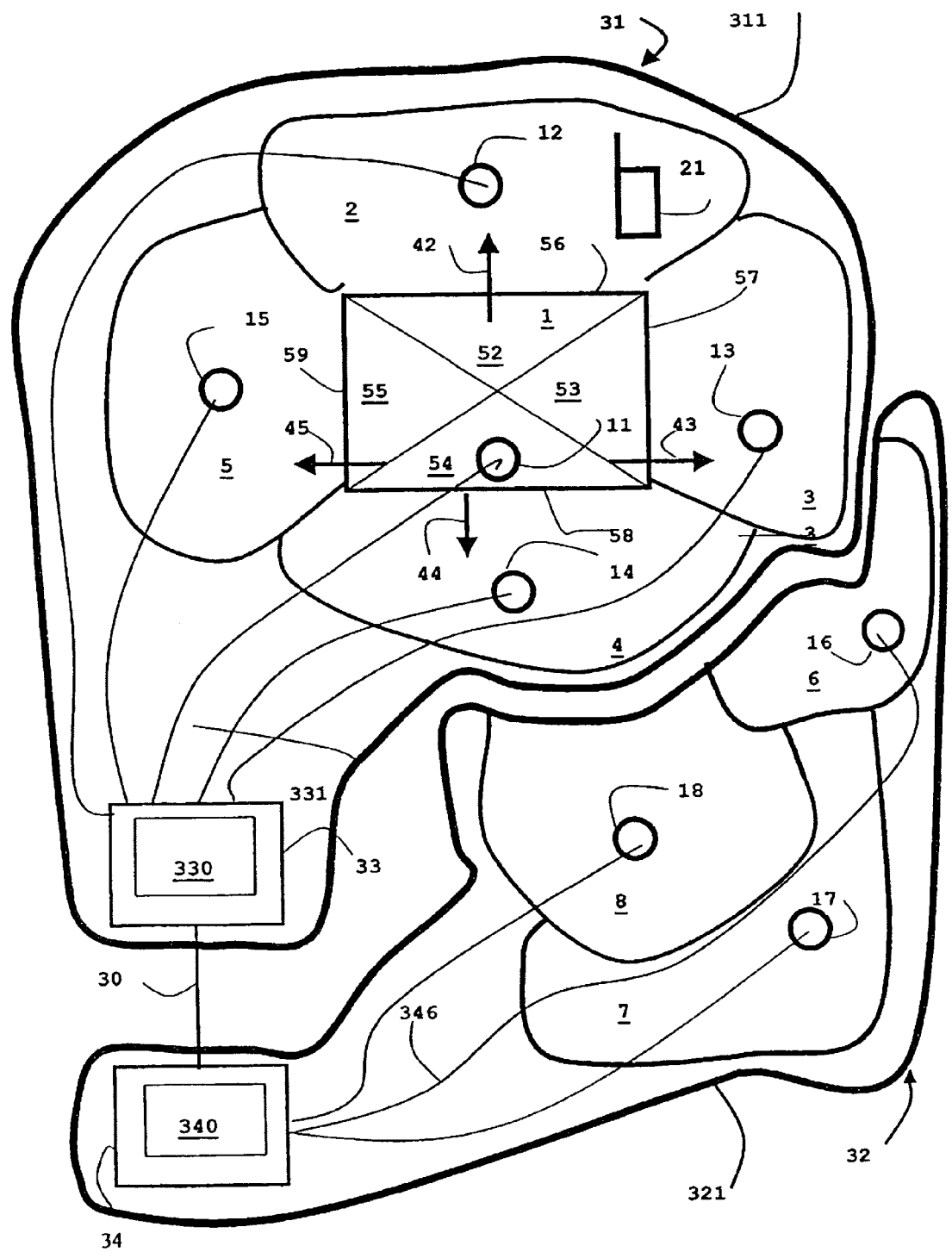

PLANIFICATION OF LOCALIZATION AREAS (LAC)

FIELD OF THE INVENTION

The present invention concerns cellular radiotelephony networks, and in particular the definition of their topology depending on the different nodal points of varying hierarchic levels that constitute the networks.

BACKGROUND OF THE INVENTION

A cellular radiotelephony network, such as GSM for example, contains several base radio stations to which mobile terminals are connected. The landline telephone network connects the base stations, and the latter guarantee radio coverage of corresponding cells, which are overlapping to avoid communication outages when mobile terminals change cells.

When users turn on their mobile terminals, the terminals are required to connect to the base station of the corresponding cell. For this to occur, a message indicating presence is sent through the signaling channel, called a control channel, also indicating field levels received from the stations within radio range, including information concerning the identity of the stations. The network processes the message, and connects the terminal to the station receiving the strongest signal. The terminal is thus registered in the mobility chart of a nodal point controlling mobility, called BSC (Base Station Controller). The charts of different BSCs thus represent the position of various turned on terminals, whether in use for communication, or idle. Calls from other terminals to a terminal can thus be routed within the network, with reference to the mobility charts.

The term cell is understood to refer to a broadcasting space positioned around the station in which broadcast waves of the station are, on the one hand, located above a specified field level, and on the other hand, above the field level received from other cells of the network.

When the terminal switches from one cell to another, the level of the wanted signal, received from the initial station, becomes significantly weaker than the one received from the station of the new cell. When the discrepancy between both levels exceeds the hysteresis threshold, the original cell erases the terminal from its charts, and the new cell records the signal. This transfer, in English, is called Hand-Over. Other than the identity of the terminal, the two cells are required to exchange specific data, and in particular data concerning the called party, if the terminal was in use for communication.

Other than the landline network, connecting base stations to traffic concentrators, in turn connected to the message switching network that handles all traffic from the radio terminals, there is also a parallel signaling network, designed to administer equipments, base and other stations of the radio network, depending on service data, or signals exchanged between cells to administer terminal mobility.

The signaling network is often integrated with the other network, and in fact consists of circuits, or reserved time paths. The signaling network thus mobilizes a certain percentage of resources, and it is thus desirable to keep its size, in terms of circuits, at the lowest possible level compatible with the level of availability needed to transmit signals within required time constraints.

OBJECT AND SUMMARY OF THE INVENTION

The present invention proposes a solution for optimizing the size of the signaling network, and for increasing the quality of the traffic network while minimizing signaling due to mobility.

For this purpose the invention concerns a procedure designed to define the topology of an existing, or anticipated, cellular radiotelephony network, consisting of several clusters, to be defined, of base stations for the administration of respective cells, with specific size and position and with several shared borders of specific length, intended to administer radio traffic, arising from a specific number of mobile terminals, distributed across cells, with the stations of each of the clusters connected to a cluster controller that is connected to other cluster controllers, intended to administer mobility of the terminals, said procedure characterized in that:

motion of the terminals is modeled according to their distribution across the various cells, using a motion algorithm that distinctly corresponds to the law of random motion for particles of ideal gases, intensity values of the flows crossing portions of the shared borders of the mobile terminals are computed using a calculator program, and a section between cells is mapped, and eventually displayed, so as to outline optimal clusters, following the closed contours of the section corresponding to a minimal value of the total intensities of the sectioned flows, according to the various contours.

Thus, according to the procedure and system of the invention, it was advantageously considered that the terminals were distributed like gas particles on the surface of various cells, displaying erratic motion, which, per unit of time, carries a certain probability of corresponding to a change in cell, with the specific number of terminals and their average speed thus defining an inter-cell exchange flow. Those cells that are practically paired, via mutual exchange of an intense terminal flow, are assigned to the same cluster, so that their traffic signal exchange, mirroring the material flow of the terminals, stays within the cluster, requiring only local network resources. Cluster controllers are limited to the exchange of traffic signals corresponding to the primary flows, sectioned from the group borders, and thus exposed to minimal traffic.

Thus, according to the invention, it is also possible to advantageously and significantly optimize anticipated networks based on existing networks, that is, to provide for physical connections even prior to activation.

Advantageously, the procedure, or computation system, estimates and specifies, using stored information concerning the type of geographic region corresponding to the position of each of the cells, an average density of the terminals in the concerned cell;

estimates, according to said law of motion, an average speed of motion for the terminals that is inversely proportional to the density, and calculates the inter-cell crossing flows for each segment of the shared borders of the concerned cell, and an adjacent cell, whose intensity varies according to the estimated average speed, the density and lengths of the considered shared borders.

Estimating density according to geographic data allows to better capture real conditions.

To map the section, defining each of the successive contours, and following which the calculations are launched, users of the computational system, seek every time to find a minimum intensity for the sectioned flow of the concerned cluster. The computational system is equipped with an interactive interface.

In this case, it is preferable to set a maximum total intensity threshold, acceptable for the sectioned flow per contour (311, 321). Thus, when users map a flow section to define a contour, they validate the topology of the concerned cluster only when the threshold has not been exceeded.

For the section, it is also possible for users, via the interactive interface, to set a minimum number of clusters to be defined, and when in the end this number is not achieved for a specific topology of several clusters, users can set parameters for another global topology, according to a different and specified contour.

Users can further set, via the interactive interface, a minimum number of stations per cluster, and when this number is exceeded for the topology of one of the clusters, the system requests another contour and sets parameters for another global topology, according to the different and specified contour.

To refine estimates, it is possible to section each of the cell representations using the interactive interface in several areas of specific terminal density, and the system calculates said flows according to the speed of the terminals, associated with the specified densities of the areas.

In this case, since the values of specific densities were previously validated according to records established following activation of certain cells of the network, several active and neighboring cellular areas are regrouped into an additional cell, and said flows are calculated using the specified validated densities.

DESCRIPTION OF THE PREFERRED EMBODIMENT

The present invention will be better understood in connection to the description of a preferred embodiment of the procedure of the invention, in reference to the single appended FIGURE, which schematically represents the topology of a cellular radiotelephony network, in the process of definition.

The anticipated network that is represented herein consists of several clusters 31, 32 of base radio stations to which a specific number of mobile radio terminals are connected, such as that which is referenced 21. For the purpose of clarity, only two clusters 31 and 32 are represented, connected via a signaling network 30. And also for the purpose of clarity, the landline network handling radio traffic is not represented, and a single mobile radio terminal is represented.

Cluster 31 consists of radio cells 1 to 5 whose traffic is guaranteed or administered by the base radio stations, respectively referenced 11 to 15, all of which are connected to a cluster BSC 33 via service links such as that which is referenced as 331. Similarly, cluster 32 consists of radio cells 6 to 8, administered by stations referenced 16 to 18, each connected to a cluster BSC 34 via service links such as that which is referenced 346. Each of the cluster BSCs 33 and 34 are intended to administer the mobility of terminals 21 when these change cells.

The drawing in fact represents an optimal and desirable topology. In other words, links such as 331 and 346 need to be defined in order to figure out how to distribute station connections 11 to 18 to the BSCs 33, 34.

When a terminal 21 transfers from one cell 1 to a neighboring cell, for example cell 3, the resulting weaker reception level, at each end of the radio link with the connecting station 11, is detected. The resulting inversion, arising between the decreasing reception level of the wanted signal and the increasing reception level of the active service signals broadcast by the new station 13 of the new cell 3, is signaled by the old station 11 and the new station 13 to the BSC 33, so as to perform the transfer, termed "hand-over" in English, occurring as terminal 21 is registered in the area of a mobility chart 330, corresponding to the new station 13, which will then take over administration of communications of terminal 21 with the new station 13.

When, later on, terminal 21 exits from the new cell 3 and enters into a bordering cell 6, corresponding to the second cluster 32, stations 13 and 16 similarly exchange signals with their respective BSCs 33, 34, and the latter then use the signaling network 30 to erase terminal 21 from the mobility chart 330 of cluster 31, and to register it in the area related to station 16 of the mobility chart 340, of BSC 34, of the second cluster 32. The goal then is to reduce the probability of occurrence of this second case, that is, to define constitutions, or cluster topologies such that terminal 21 stays statically for the longest period of time in any one cluster.

Each cell, with a specific size and geographic location, consists of portions, or segments of shared borders, or frontiers with other cells. Thus, cell 1 consists of segment borders 56, 57, 58 and 59, of respective specific lengths, shared with cells 2 to 5 that are respectively surrounding it.

According to the procedure of the invention, for the definition of the topology of a cellular radiotelephony network, consisting of several, to be defined, clusters 31, 32, of base stations 11 to 18, intended for the administration of respective cells 1 to 8, of specific sizes and locations, with various portions of shared borders 56 to 59 of specific lengths, designed to administer radio traffic of a specific number of mobile terminals 21, distributed across cells 1 to 8, a certain number of stations 11 to 15 and respectively 16 to 18 define each respective cluster 31 and 32, each connected to the respective cluster controllers 33, 34, connected via links to other controllers 34, 33, for the administration of mobility charts of terminals 21, the procedure consisting in modeling motion of terminals 21, to define their distribution across the various cells 1 to 8, using a formal law of motion corresponding distinctly to the law of random motion of particles of ideal gases;

calculation of the intensity values of flows 42 to 45, crossing the portions of shared borders 52 to 55, via the mobile terminals 21, and mapping of a section between cells 1 to 8 of the network, in order to define optimal clusters 31, 32, according to closed contours 311, 321, of the section corresponding to a minimal value of the total intensities of the flows 42 to 45, limited by the contours 311, 321, of the concerned cluster.

As a reminder, the law of particle or molecule motion of ideal gases works to define the lengths of average free paths between two collisions of particles. Per a unit of digit time, a particle is located in a cylindrical section volume corresponding to its size, and with a length proportional to its speed, related to temperature. Thus collision arises, when two of the primary volumes display an intersection, when both of the particles are located at the same moment in the intersection area. The collisions are assumed perfectly elastic, that is, the speed vector, or the quantity of motion, preserves its amplitude.

The probability of collision thus increases with the density of particles, and the average length or duration of the free path varies according to the inverse of the collision probability. As a result, for the case of numerous collisions, a sort of particle confinement occurs.

In other words, a portion of the trajectory interrupted according to a specific length (or according to a specific duration of the path) consists of a certain number of segments, paths with a constant speed, with different and random orientations.

When density is low, the portion of the trajectory consists of a restricted number of large segments. The probability of collision occurring at the edge or wall of the global volume is thus high.

When, on the other hand, density increases, the few straight and large abovementioned segments, are each broken up into several chunks of varying orientations, statistically perpendicular since they are equally distributed across all directions, according to the principle of motion termed Brownian. The global trajectory then 'land rolls' and particle motion then functions according to probability law with a strong component that tends to impose stationary motion of confinement. The probability of a collision occurring at the edge of the total volume is then reduced. In other words, the apparent range rate, statistic or average, or non-stationary, is then reduced.

More precisely, for the computation of topology, an estimate is calculated here, according to stored information that specifies a type of geographic area for the position of each of the cells 1 to 8, an average density of the terminals 21 in the concerned cells 1 to 8, for example a mountain area with low population density, stretch of water, a forest, or other type of area, following which an estimate, according to said law of motion for particles of ideal gases, is calculated for the average motion of the terminals 21, that is inversely proportional to the density, and the inter-cell 42 to 45 crossing flow for each segment of the shared borders 56 to 59 of the concerned cell 1, with an intensity that varies according the average estimated speed, the density and the lengths of the concerned shared borders 56 to 59.

The following function is thus derived, in formula (1), between speed V of the terminals 21 and the other variables;

$$V = S/N \times Fl/P \tag{1}$$

Where:
S: equals the surface of the concerned cell 1
N: equals the average number of terminals of cell 1, increasing according to surface S,
Fl: equals the flow 42 of terminals 21
P: equals the length of the perimeter section 56, or border 56 of cell 1 crossed by the flow 42.

S/N thus represents the density D, or concentration of terminals 21, in cell 1.

When the concerned cell 1 is already activated, known information includes the surface S and the perimeter P, the average number N of terminals 21, and the characteristics of their telephone traffic, that is, flows 42 to 45. Speed V, exiting from cell 1, is thus deduced and used to set said equation 1 for an anticipated cell.

Thus, for the latter, formula (1) becomes formula (2):

$$Fl = V \times PD \tag{2}$$

capable of calculating anticipated flows 42 to 45.

When the concerned flow 42 refers to two cells 1 and 2 of the same cluster 31, signaling traffic for hand-overs stays confined to cluster 31, without using network 30, inter-BSC 33, 34. However, a flow crossing, for example between cell 3 of cluster 31, and cell 6 of cluster 32, induces such signaling traffic in network 30.

The overall values of flows 42 to 45 of the various cells 1 to 8 of the network, thus represent a matrix of constraints for the section to be mapped of the network in clusters 31, 32.

To thus reduce to a minimum the signaling network traffic 30, contours 311 and 321 are successively defined, each time seeking to obtain a minimum flow intensity, such as 42 to 45 sectioned from the concerned cluster 31, 32, towards a neighboring cluster of concerned cluster 31, 32. Here, the opposing entry flows are assumed of the same value as that of their respective exiting counterparts. This hypothesis may turn out false, for example in the case of a channel with high vehicle traffic, and a single direction of circulation crossing the cell, which passengers are likely to call. Rigorously speaking, the inter-cell flow to be considered is equal to the sum of the absolute values of the opposite flows, with the entry flow in one cell, calculated as indicated, as equal to the flow exiting another cell.

Thus, the goal is to define a cluster section that minimizes a cost function Ct, represented in formula (3) as the sum of the sectioned bi-directional flows, which it is possible to qualify according to the capacity of the network:

$$Ct = (Flej + Flsj)/(\text{capacity} j)^2 \tag{3}$$

where:
Flej: equals the sectioned entry flow,
Flsj: equals the sectioned exit flow,
and J corresponds to an index designating the concerned cluster 31.

The abovementioned capacity may, for example, be expressed by the number of subscribers to the concerned cluster 31, or by the number of cells 1 to 5 of cluster 31. The cost function Ct needs to be optimized globally, that is, it represents the sum of functions for the primary costs of each of the clusters 31, 32. Respective minimums for clusters 31, 32 can thus be derived, knowing however that an optimal section 311 of cells 1 to 5, corresponding to a minimum for the function of primary costs of cluster 31 may be questioned. It is true that a change in the section of cluster 31, with degrading of the corresponding function for primary costs, may at least be compensated by an improvement of one or several of the other functions for primary costs of other clusters 32.

An optimization algorithm, executed on the basis of the calculation system, maps progressive regroupings of the neighboring cells, that is, a contour 311, 321, is progressively modified via inclusion of adjacent cells or exclusion of border cells, so as to determine the functions for the primary costs of various topologies thus defined.

In particular users can, using interactive means of the calculation system, or the calculation program, set a maximum and acceptable total intensity threshold for the flow sectioned by contours 311, 321, and when a flow section path is mapped to define one of contours 311, 321, the topology of the concerned cluster 31, 32 is validated, that is, the identity of the stations or component cells, when the abovementioned threshold has not been exceeded.

Solutions that appear optimal, but unrealistic would consist in considering only a very restricted number of BSCs 33, 34, even just one. In contrast to this type of solution, a minimum number of clusters 31, 32, are set to be defined (or a maximum number of cells per cluster), and when this number in the end is not achieved for a particular topology, consisting of several clusters 31, 32, another global topology is defined, according to different contours.

For the same purpose, in order to balance the distribution of stations 11 to 18 across different clusters 31, 32, using interactive means with the calculation system or the calculation program, a minimal number of stations 11 to 18 is set per cluster 31, 32, and when this number is exceeded for a given topology of one of clusters 31, 32, users or the program may map another global topology definition, according to different contours 311, 321.

In this example, each cell 1 to 8 is sectioned into several specific terminal density areas 21. For the purpose of clarity, only areas 52 to 55 of cell 1 have been represented, limited by respective border segments 56 to 59. Each area 52 to 56 contains geographic characteristics, and thus a terminal density that is unique. Calculation of speeds is then performed for each of the areas 52 to 55, and said flows crossing the segment borders 56 to 59 are calculated according to the speeds of terminal 21, associated with the specific densities of areas 52 to 55. A defined flow 42 of a border segment 56 can thus be calculated by adding the exit flows of area 52 associated to a segment of border 56 and the flows of the other areas 53 to 55. In particular, a segment of border 56 to 59 could, in another example, limit several different intensity areas 52 to 55.

It could also be necessary to add one cell 1 to a network of existing cells 2 to 8. In this case, the one cell 1 consists of four areas 52 to 55, which initially belonged to the respective neighboring cells 2 to 5, and where telephone traffic was observed, and as outlined earlier for the explanation of formula (1), the areas can, for example, be defined in several ways using means of display of the calculation system with the use of interactive means for the definition of areas. This traffic thus supplies the density D of active terminals 21, which represents for a defined coefficient of activity, the number of terminals 21, active or idle.

Once the specific values of density D are thus validated by stored records following activation of cells 2 to 5, several areas 52 to 55 of active neighboring cells 2 to 5 are regrouped into one additional cell 1, and the calculation system computes said flows 42 to 45 using the specific validated densities, which allowed to obtain the values of flows 42 to 45.

It should be obvious to those specialists of the field that the present invention allows for numerous other embodiments of varying forms, without departing from the domain of application of the invention, as claimed. Consequently, the present embodiments are to be considered illustrations that can further be modified in the domain defined by the scope of the included claims.

What is claimed is:

1. A computerized method of modeling the topology of an existing or anticipated cellular radiotelephony network having (a) several clusters to be defined, (b) base stations for the administration of respective cells of defined size and position, (c) diverse segments of shared borders of defined lengths for administering radio traffic of a specific number of mobile terminals distributed across cells, and (d) stations of each cluster, linked to a cluster controller linked to other cluster controllers to administer mobility of the terminals, the method comprising:

modeling motion of the terminals based on a definition of the distribution thereof across various cells, the modeling being performed by using a motion algorithm corresponding to the law of random motion for particles of ideal gases, computing intensity values of the flows crossing segments of shared borders of the mobile terminals using a calculator program, and mapping a section between cells outlining optimal clusters following closed contours of the section corresponding to a minimal value of the total intensities of the sectioned flows according to the various contours.

2. A method according to claim 1, further including calculating:

(a) estimates using stored information concerning the type of geographic region corresponding to the position of each of the cells for an average density of the terminals of the concerned cell, (b) estimates according to said law of motion, for an average speed of motion for the terminals that is inversely proportional to density of the terminals, and (c) the inter-cell crossing flows for each segment of the shared borders of the concerned cell, with an intensity that varies according to the estimated average speed, the density and lengths of the considered shared borders.

3. A method according to claim 2, in which contours are successively defined to seek each time a contour is defined a minimum intensity of the sectioned flow for the concerned cluster.

4. A method according to claim 3, further including setting a maximum threshold of total acceptable intensity of the sectioned flow per contour and defining one of the contours in response to a path of the sectioned flow being mapped, and validating the topology of the concerned cluster in response to the threshold not being exceeded.

5. A method according to claim 4, in which a minimal number of clusters to be defined is set, and another definition of the global topology according to different contours in response to this number in the end not being achieved for a given topology having several clusters.

6. A method according to claim 5, in which a minimal number of stations is set per cluster and mapping another global topology definition according to the different contours in response to the minimal number being exceeded for the topology of one of the clusters.

7. A method according to claim 6, in which each cell is sectioned into several areas with a specific density of terminals and calculating said flows according to the speed of terminals in connection with the specific densities of the areas.

8. A method according to claim 7, further including validating the specific density values by records following activation of the certain cells of the network, regrouping several areas of neighboring active cells in an additional cell, and calculating said flows according to the specific densities that are validated.

9. A method according to claim 1, in which contours are successively defined to seek each time a contour is defined a minimum intensity of the sectioned flow for the concerned cluster.

10. A method according to claim 1, in which a minimal number of clusters to be defined is set, and another definition of the global topology according to different contours in response to this number in the end not being achieved for a given topology having several clusters.

* * * * *